United States Patent [19]

Tanaka et al.

[11] Patent Number: 5,715,109
[45] Date of Patent: Feb. 3, 1998

[54] OPTICAL DISK REPLAY DEVICE WHICH VARIES A DELAY AND FREQUENCY OF A REPRODUCED SIGNAL BASED ON A POSITION OF AN OPTICAL HEAD

[75] Inventors: Shinichi Tanaka, Kamakura; Naoto Inaba, Hiratuka, both of Japan

[73] Assignee: Nikon Corporation, Tokyo, Japan

[21] Appl. No.: 723,245

[22] Filed: Sep. 30, 1996

Related U.S. Application Data

[62] Division of Ser. No. 405,253, Mar. 16, 1995, abandoned.

[30] Foreign Application Priority Data

| Mar. 16, 1994 | [JP] | Japan | 6-044612 |
| Mar. 16, 1994 | [JP] | Japan | 6-044614 |
| Feb. 21, 1995 | [JP] | Japan | 7-032018 |

[51] Int. Cl.[6] .................................................. G11B 5/035
[52] U.S. Cl. .................................................. 360/65; 369/60
[58] Field of Search .................................. 369/47, 48, 53, 369/54, 58, 60, 124; 360/24, 25, 27, 65

[56] References Cited

U.S. PATENT DOCUMENTS

| 3,567,849 | 3/1971 | Takayanagi et al. | 360/9.1 |
| 4,786,989 | 11/1988 | Okamura et al. | 360/65 |
| 5,414,689 | 5/1995 | Maeda et al. | 369/59 |
| 5,440,434 | 8/1995 | Kanegae | 360/65 |

*Primary Examiner*—P. W. Huber

[57] ABSTRACT

An optical disk replay device for replaying information from an optical disk recorded in a modified constant angular velocity (MCAV) format. The optical disk replay device has an optical head to output a reproduced signal based on the information stored in the optical disk. The signal from the optical head is passed through a series of delay circuits which output delayed signals based on the reproduced signal. Thereafter, a calculating circuit sums, or subtracts, the delayed signals and outputs an intermediate reproduced signal to a band limiting circuit which attenuates the frequency of the intermediate reproduced signal. A control circuit changes the amount of delay imparted by the delay circuits and to adjust the frequency range of the band limiting circuit.

7 Claims, 6 Drawing Sheets

OPTICAL DISK REPLAY DEVICE WHICH VARIES A DELAY AND FREQUENCY OF A REPRODUCED SIGNAL BASED ON A POSITION OF AN OPTICAL HEAD

This application is a division of application Ser. No. 08/405,253, filed Mar. 16, 1995, now abandoned.

BACKGROUND OF THE INVENTION

1. Field of the Invention

The present invention relates to an optical disk replay device, and in particular, relates to an optical disk replay device which performs waveform equalization of reproduced signals.

2. Description of the Related Art

Optical disk devices replay information recorded on optical recording media, such as optical disks and magneto-optical disks.

FIG. 7 is a block diagram of a waveform equalization circuit for the waveform equalization of reproduced signals from magneto-optical disks recorded in a constant angular velocity "CAV" format. A waveform equalization of a reproduced signal 78, as read by an optical head, must be performed to compensate for the resolving power of the lens of the optical head. The reproduced signal is typically dulled, i.e. the edges of the waveform are dull. The dullness of the reproduced signal, such as the signal waveform 78, compared with the resolving power of an optical disk arises due to the small size of the marks (denoting information bits) recorded on the disk. The waveform equalization minimizes differences in signal amplitude due to the differences in the size of the recorded marks or displacements in position. Known waveform equalization circuits are typically transversal filters generally comprising delay lines 71a–71d, multipliers (voltage control type variable gain amplifiers) 72a–72e, and an adder 76.

The reproduced signal 78 is input to the delay line 71a and the multiplier 72a. The reproduced signal 78 is output from the delay line 71a with a predetermined time delay, and is input to the delay line 71b. The reproduced signal 78, is thereafter successively input to the delay lines 71c and 71d, and is delayed by a predetermined time in the respective delay lines. The reproduced signals 78, output from the delay lines 71b, 71c and 71d, are respectively input to the multipliers 72b, 72c, 72d and 72e. Voltage signals from a D/A converter 75 are also input to the respective multipliers. The gain can be adjusted, with respect to the reproduced signals 78, using the voltage signals from the D/A converter.

The output signals from the multipliers 72b and 72d are input to a minus input terminal of an operational amplifier 77 in the adder 76. The output signals from the multipliers 72a, 72c and 72e are input to a plus input terminal of the operational amplifier 77 in the adder 76. The adder 76 outputs a waveform 79.

The amount of delay, due to the delay lines, can be determined by the standard clock frequency of the recorded signals (or reproduced signals 78). The required gain of the multipliers can be determined by the mark length corresponding to the standard clock frequency. Because the standard clock frequency is fixed in the CAV format, the delay amount of each delay line may be constant. Moreover, because a mark length corresponding to the standard clock frequency differs according to the radial position on the disk, the gain of each multiplier must be changed according to the radial position of the optical head on the disk. The D/A converter 75 sets the gain of each multiplier according to the position of the optical head in a radial direction on the disk. A CPU 74 detects the position of the optical head with a head position sensor 73.

The S/N ratio is controlled by the attenuation of frequency components of the reproduced signal outside the necessary band, and is generally effected by using a passive type of low pass filter (typically, a fourth order Bessel filter). FIG. 8 shows an example of a passive low pass filter as used in the prior art.

In recent years, in order to increase the recording density of optical disks, a recording format called the modified constant angular velocity "MCAV" format has been used. In the MCAV format, the closer to the recording track is to the outer circumference of the disk, the higher the standard frequency of the associated clock signal. However, when using the above-described prior art technology with disks recorded in the MCAV format, it is difficult to properly perform waveform equalization on the reproduced signal because the standard clock frequencies of the signals recorded on the disk differ according to the radial position on the disk. Moreover, in the MCAV format because the standard clock frequency of the recorded signals differs according to the radial position on the disk, the frequency band of the reproduced signals also differs according to the radial position on the disk.

Further, when using the above-described prior art technology with disks recorded in the MCAV format, it is difficult to set the cutoff frequency of the low pass filter. In the MCAV format, the frequency band of the reproduced signal is widest for the reproduced signals of the outermost record track. Consequently, when the cutoff frequency of the low pass filter is set according to the reproduced signal of the outermost record track, the S/N ratio of the reproduced signals of the inner record tracks, which have a narrow frequency band, becomes poor.

SUMMARY OF THE INVENTION

Accordingly, it is an object of the present invention to provide an optical disk playback device which can perform waveform equalization on reproduced signals from optical disks which have been recorded in the MCAV format.

It is another object of the invention to provide an optical disk playback device which can ensure a correct S/N ratio in the playback of optical disks which have been recorded in the MCAV format.

It is a further object of the present invention to provide an optical disk playback device wherein the delay amounts of delay circuits can change corresponding to the position of an optical head in a radial direction on an optical disk.

It is yet a further object of the invention to provide an optical disk playback device wherein the cutoff frequency of a band limiting circuit can change corresponding to a radial position of an optical head with respect to an optical disk.

Additional objects and advantages of the invention will be set forth in part in the description which follows, and, in part, will be obvious from the description, or may be learned by practice of the invention.

Objects of the present invention are achieved in an optical disk replay device comprising an optical head to output a reproduced signal based on information stored on an optical disk, a plurality of delay circuits connected to the optical head to output a plurality of delayed signals based on the reproduced signal, a calculating circuit, connected to the plurality of delay circuits, to sum the plurality of delayed signals and output an equalized reproduced signal, and a control circuit to change the amount of delay in the plurality of delayed signals based on the position of said optical head.

Objects of the present invention are further achieved by an optical disk replay device comprising an optical head to output a reproduced signal based on information stored on an optical disk, a band limiting circuit, connected to the optical head, to attenuate the frequency of the reproduced signal and output an equalized reproduced signal having a predetermined frequency range, and a control circuit adapted to change the predetermined frequency range based on the position of the optical head.

Objects of the present invention are also achieved by an optical disk replay device comprising an optical head to output a reproduced signal based on information stored on an optical disk, a plurality of delay circuits, connected to the optical head, to output a plurality of delayed signals based on the reproduced signal, a calculating circuit to sum the plurality of delayed signals and output an intermediate reproduced signal, a band limiting circuit, connected to the calculating circuit, to attenuate the frequency of the intermediate reproduced signal and output an equalized reproduced signal having a predetermined frequency range, and a control circuit to change the amount of delay in the plurality of delayed signals based on the position of the optical head and to change the predetermined frequency range based on the position of the optical head.

Objects of the present invention are also achieved in a playback device comprising a replay signal output head to replay information recorded on an optical disk, a plurality of delay circuits having a variable amount of delay, the plurality of delay circuit receiving a reproduced signal and outputting a delayed reproduced signal, a calculating circuit to output the replay signals output from the plurality of delay circuits, and a control circuit for detecting the position of the head and, according to the detected head position, causing the amount of delay of the delay circuits to change.

Objects of the present invention are also achieved in a optical disk replay device comprising a head to output replay signals from an optical disk, a band limiting circuit for receiving the replay signals, attenuating the replay signals and outputting to frequency components outside a predetermined frequency band within the reproduced signals, and a control circuit for detecting the position of the head and, according to the detected head position, causing the frequency of the attenuation to change.

Objects of the present invention are also achieved in an optical disk replay device comprising a replay signal output head for replaying information recorded on an optical disk, a plurality of delay circuits, the amount of delay being variable, inputting the reproduced signals and outputting delayed reproduced signals having a variable amount of delay, a calculating circuit to output the replay signals output from the plural delay circuits, a band limiting circuit for receiving the output signals from the calculating circuit, and outputting of the frequency components outside a predetermined frequency band within the reproduced signals, and a control circuit, detecting the position of the head and, according to the detected head position, causing the amount of delay of the delay circuits and the predetermined frequency band to change.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
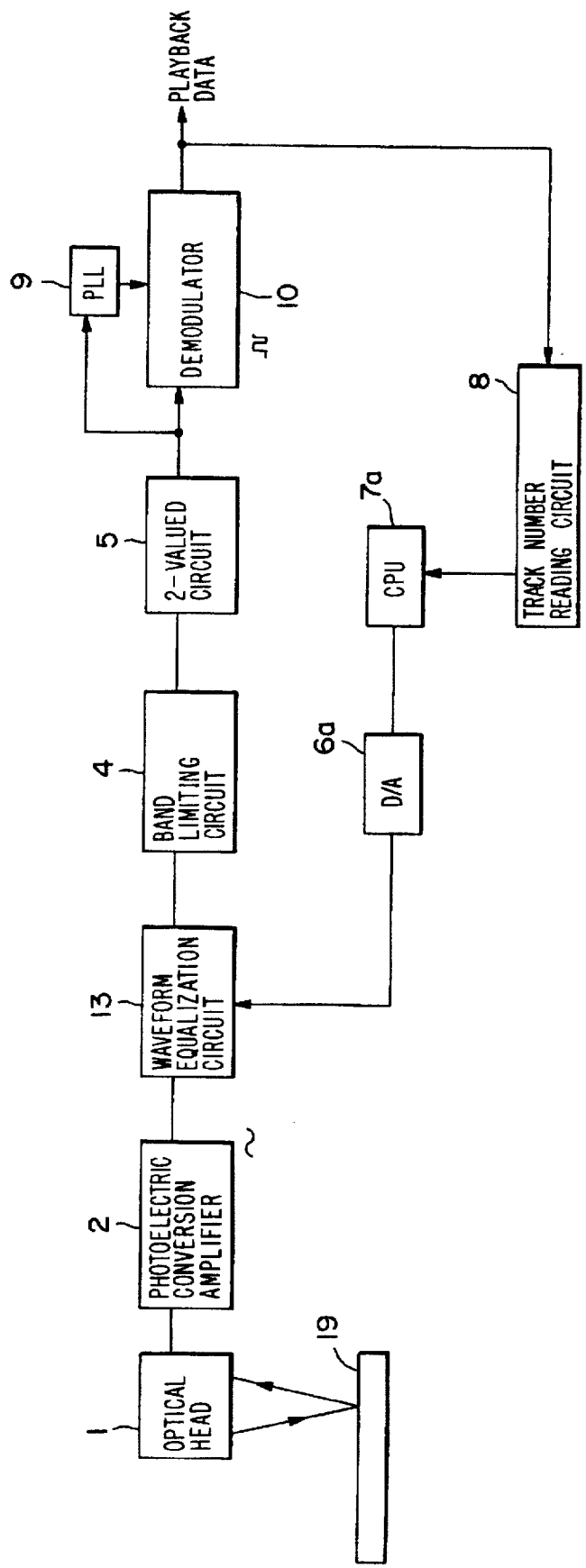
FIG. 1 is a diagram of an optical disk playback device according to a first preferred embodiment of the present invention.

Reference will now be made in detail to the present preferred embodiments of the present invention, examples of which are illustrated in the accompanying drawings, wherein like reference numerals refer to like elements throughout.

FIG. 1 is a diagram of an optical disk playback device according to a first preferred embodiment of the present invention. An optical head 1 projects a laser beam on the information recording surface of an optical disk 19, and, by receiving the reflected light, reads the signal recorded on the optical disk 19. The optical signal read by the optical head 1 is input to a photoelectric conversion amplifier 2 and converted into an electrical signal. The electrical signal is input to a waveform equalization circuit 13 as a reproduced signal.

Figure 8:
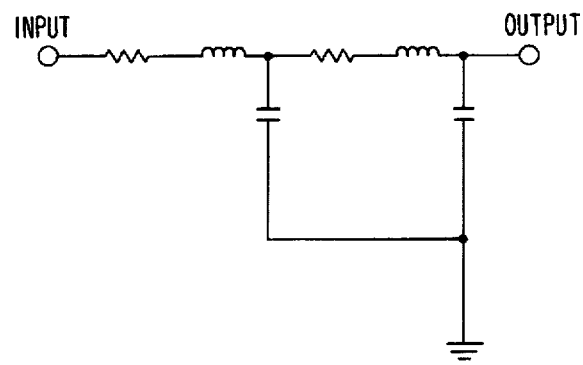
FIG. 8 is a diagram of a passive type low pass filter in accordance with the prior art.

The reproduced signal whose waveform has been equalized by the waveform equalization circuit 13 is input to a band limiting circuit 4. Preferably, the band limiting circuit 4 is a low pass filter. The low pass filter 4 generally comprises resistors and capacitors interconnected, as set forth with reference to FIG. 8. The band limiting circuit 4 has an output in which only the frequency components above a predetermined frequency (the cutoff frequency), in the reproduced signal, are attenuated.

The reproduced signal, as output from the band limiting circuit 4, is input to a 2-valued circuit 5. In the 2-valued circuit 5, according to whether the level of the reproduced signal is higher or lower than a predetermined level, the signal is 2-valued. The 2-valued signal, output from the 2-valued circuit 5, is input to a phase locked loop "PLL" circuit 9 and a demodulation circuit 10. In the PLL circuit 9, a clock signal is generated, phase synchronized with the reproduced signal, and output to the demodulation circuit 10. The demodulation circuit, based on the clock from the PLL circuit 9, demodulates the 2-valued signal. The data recorded on the disk 9 are generally modulated at the time of recording. The demodulation circuit 10 performs a process of restoring modulated data. The output from the demodulation circuit 10 is used as the reproduced data from the optical disk playback device. The playback data is also input to a track number reading circuit 8.

Generally, a plurality of concentric circular, or spiral tracks, are disposed on the recording surface of an optical disk with data being recorded along each track. An identification number is recorded in each track. Accordingly, by reading the identification number, of a track from among the reproduced data, the track from which the reproduced data was read can be identified. From the identification number, the track which is the target of the laser beam from the optical head 1 (namely, the position in a radial direction with respect to the optical disk 19) can be detected.

The track number reading circuit 8 detects the track identification number from among the reproduced data. Then, based on the detected identification number, information indicating the position of the optical head 1 is transmitted to a CPU 7a.

The CPU 7a, based on information indicating the position of the optical head 1, changes the amount of delay imparted by the waveform equalization circuit 13.

Figure 2:
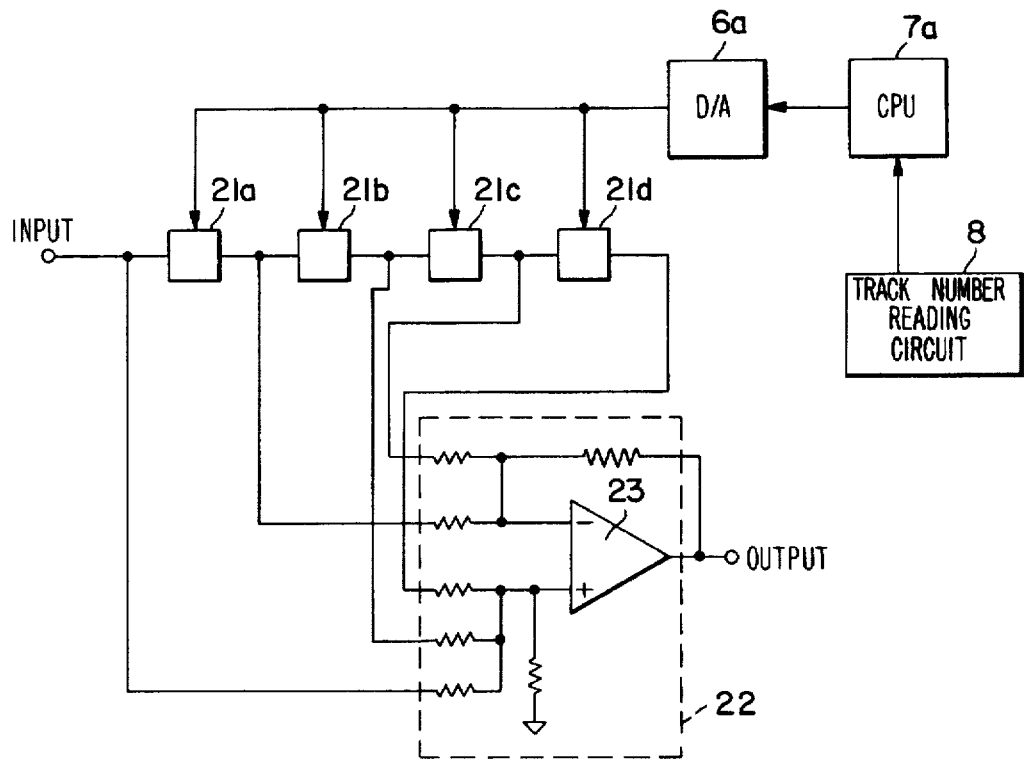
FIG. 2 is a diagram of a waveform equalization circuit of an optical disk playback device according to the first preferred embodiment of the present invention.

FIG. 2 is a diagram of the waveform equalizing circuit 13 in accordance with the first preferred embodiment of the present invention. A plurality of constant time delay filters 21 a–d effect a constant time delay on the output signal with respect to the input signal. The constant time delay filters 21a–d have a gain which does not change, even when the frequency of the input signal changes.

The reproduced signal is first input to the constant time delay filter 21a. The constant delay filter 21a outputs a signal, with a constant time delay, to a constant time delay filter 21b. The signal, after passing through the constant time delay filter 21b, is input in succession to the constant time delay filters 21c and 21d.

The signals output from the constant time delay filter 21a and the constant time delay filter 21c are also input to the minus input terminal of an operational amplifier 23 situated in an adder 22. The signals output from the constant time delay filter 21b and the constant time delay filter 21d, and the reproduced signal, before being input to the constant time delay filter 21a, are input to the plus terminal of the operational amplifier 23 in the adder 22 which sums the signals, i.e. by either adding or subtracting the individual signals. The output from the operational amplifier 23 is input to the band limiting circuit 4 (see FIG. 1).

Figure 3:
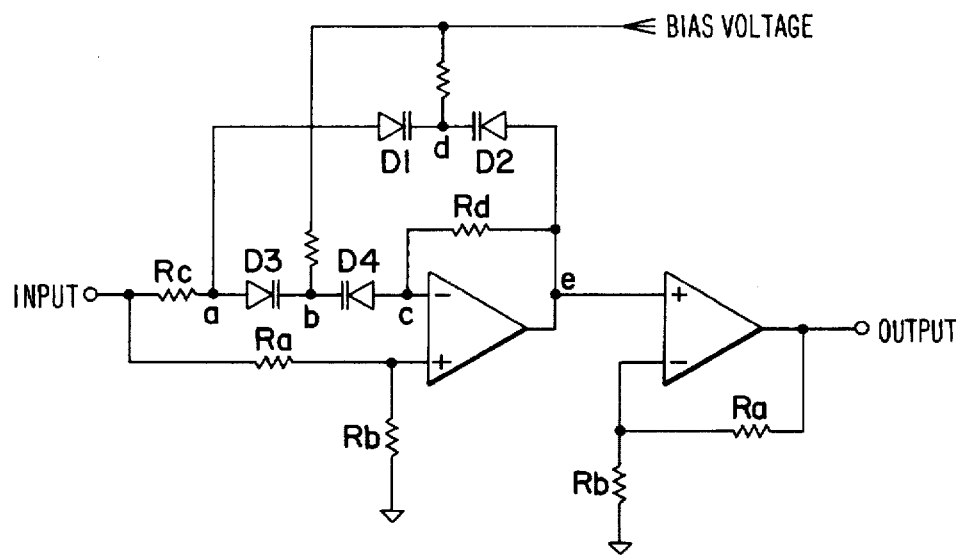
FIG. 3 is a diagram of the constant time delay filters of an optical disk playback device according to the first preferred embodiment of the present invention.

FIG. 3 is a circuit diagram of the constant time delay filters 21a–d. The constant time delay filters, in accordance with the first preferred embodiment of the present invention, generally comprise resistors Ra–Rd, variable capacity diodes D1–D4, and amplifiers. The variable capacity diodes have a capacity which changes according to the impressed voltage level. Namely, the capacities of the variable capacity diode D1 and the variable capacity diode D2 change according to the voltage impressed at a point d. Moreover, the capacities of the variable capacity diode D3 and the variable capacity diode D4 change according to the voltage impressed at a point b.

The variable capacity diode D1 is connected in reverse with respect to a point a, and the variable capacity diode D2 is connected in reverse with respect to a point e. As a result, the direct current component of the voltage impressed at the point d is excluded at the point a and the point e. In other words, the variable capacity diode D1 and the variable capacity diode D2 operate similar to capacitors. Similarly, the direct current component impressed at point b is excluded, such that the variable capacity diode D3 and the variable capacity diode D4 operate similar to capacitors.

The operational amplifier 23 is provided to amplify and output an output signal from the adder 22.

In the constant time delay filter, as set forth in FIG. 3, the voltage impressed at point b and point d can be changed, by changing the bias voltage. The capacities of the variable capacity diodes D1–D4 are changed by changing the voltage impressed at the point b and the point d. If the bias voltage becomes large, the respective capacities of the variable capacity diodes D1–D4 become small. The smaller the capacities of the variable capacity diodes D1–D4 become, the smaller the amount of delay imparted by the constant time delay filters 21a–21d.

In accordance with the first preferred embodiment of the present invention, the optical disk 19 is caused to rotate at a fixed rpm in accordance with the CAV (constant angular velocity) format or the MCAV (modified constant angular velocity) format.

In the CAV format, the optical disk 19 is caused to rotate at a constant rpm, and the record and playback frequency (standard clock frequency) is the same regardless of which track of the optical disk 19 is being accessed. In the CAV format, the linear velocity increases in the track closer to the outer circumference at the optical disk 19. Since the record frequency is the same regardless of the track, the length of the recorded marks becomes longer, in tracks closer to the outer circumference. Accordingly, the record density becomes smaller in tracks closer to the outer circumference.

In the MCAV format, the optical disk is also caused to rotate at a constant rpm, but the record and playback frequency (standard clock frequency) becomes higher in tracks closer to the outer circumference. Thus, the record density is approximately constant regardless of the track being accessed. In other words, the length of the recorded marks is approximately constant regardless of the track being accessed.

The optical disk 19, in accordance with the first preferred embodiment of the present invention, is preferably recorded in the MCAV format such that the necessary frequency band becomes higher as the reproduced signals are read from tracks which are nearer to the outer circumference of the optical disk 19.

Referring once again to FIG. 2, the CPU 7a, outputs a larger value (digital value) to the D/A converter 6a the nearer the head position, as determined by the track number reading circuit 8, is to the outer circumference. The D/A converter 6a outputs a bias voltage to the respective constant time delay filters 21a–d. As a result, the closer the head comes to the outer circumference of the optical disk 19, the smaller the delay amount becomes due to the constant time delay filters 21a–d.

The delay amount preferably corresponds to the standard clock frequency. When the standard clock frequency is Fc and the delay amount is Td, it is preferable that the relationship becomes:

Td=K/Fc (K is a proportional constant)

Thus, the closer the track, producing the playback signal, is to the outer circumference of the optical disk 19, the smaller the delay amount becomes.

In order to make the delay amount satisfy the relationship of the above equation, a variety of output values are stored in a semiconductor memory. The CPU 7a reads out the appropriate value from the memory, based on the head position information, and outputs the value to the D/A converter 6a.

Figure 7:
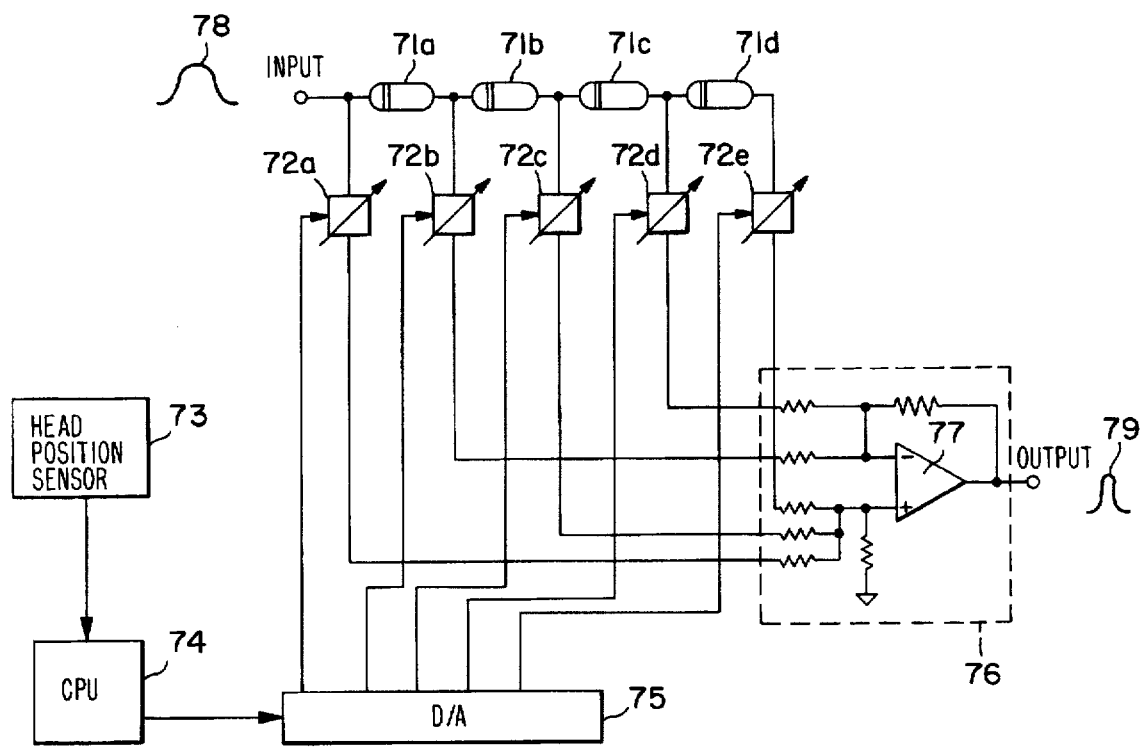
FIG. 7 is a diagram of a waveform equalization circuit in accordance with the prior art.

In accordance with the first preferred embodiment of the present invention, it is preferable to set the gain of each constant time delay filter equal to one. In the prior art, as set forth in FIG. 7, the gain of the multiplier is changed.

However, according to the first preferred embodiment of the present invention, because the length of the marks do not significantly change with radial position, a multiplier is not necessary. It is also not necessary to change the gain of the constant time delay filters. The gain of the band limiting circuit is set according to the adjustment of the ratio of each resistor value of the adder 22.

It is preferable that the characteristics of the variable capacity diode D1 be similar to characteristics of the variable capacity diode D2. Further, it is preferable that the characteristics of the variable capacity diode D3 be similar to the characteristic of the variable capacity diode D4. It is furthermore preferable for the characteristics of all the variable capacity diodes D1–D4 to be the same.

Although the first embodiment of the present invention has been described with respect to a specific configuration, it will be recognized that the first embodiment is not limited to the specific configuration. For example, the first embodiment has been described with respect to the use of the optical disk 19 as a type of disk used solely for playback. However, it may also be an magneto-optical disk, a rewritable optical disk, or the like.

Further, while the preferred embodiment of the present invention has been described with respect to the use of a MCAV format, a zone CAV format may be used. The zone CAV format separates plural tracks of the disk into plural groups. These groups are called zones. The zones are present in donut form. Recording and playback are performed at the same constant clock frequency for tracks belonging to the same zone. In this manner, the record density of each zone is approximately constant. The digital value output from the CPU is changed according to the group to which the track at the head position belongs.

Figure 4:
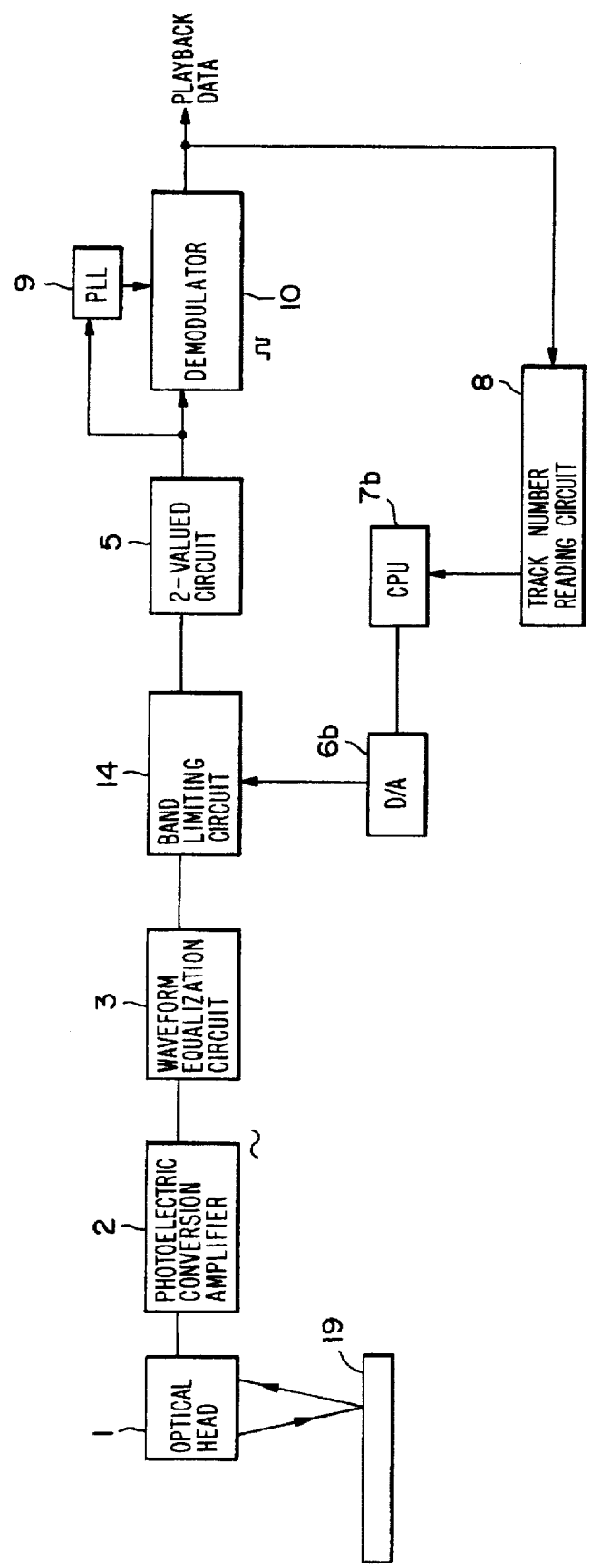
FIG. 4 is a diagram of an optical disk playback device according to a second preferred embodiment of the present invention.

FIG. 4 is a diagram of an optical disk playback device according to a second preferred embodiment of the present invention. The optical disk playback device, in accordance with the second preferred embodiment, generally comprises an optical head 1, an optical disk 19, a photoelectric conversion amplifier 2, a 2-valued circuit 5, a PLL circuit 9, a demodulator circuit 10, and a track number reading circuit 8, each of which are similar to those set forth with respect to the first preferred embodiment of the present invention. In accordance with the second preferred embodiment of the present invention, the waveform equalizing circuit 3 is similar to the circuit set forth with respect to FIG. 7, but the multiplier, and the circuitry required to change the gain of the multiplier, are not necessary.

Figure 5:
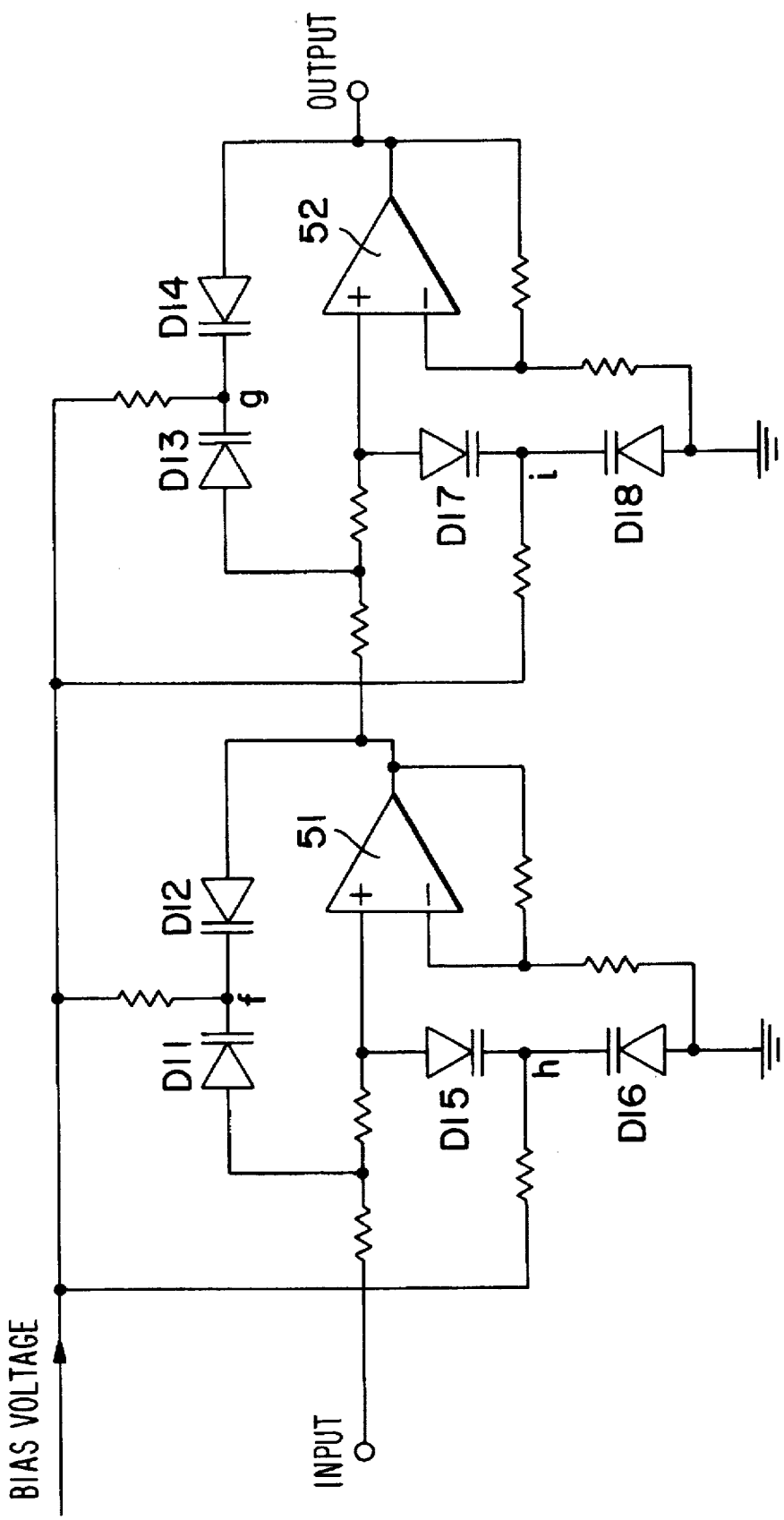
FIG. 5 is a diagram of the band limiting circuit of an optical disk playback device according to the second preferred embodiment of the present invention.

FIG. 5 is a circuit diagram of a band limiting circuit 14 of the second preferred embodiment of the present invention. The band limiting circuit 14 is a positive feedback type of active filter, generally comprising operational amplifiers 51 and 52, variable capacity diodes D11–D18 and resistors. The cutoff frequency can be changed by changing the bias voltage of the variable capacity diodes D11–D18. The variable capacity diodes D11–D18 operate similarly to capacitors and change in capacity according to the level of the bias voltage impressed at points f, g, h and i. The larger the bias voltage at each point, the smaller the capacity of the variable capacity diodes connected to that point. When the capacity of the variable capacity diodes becomes small, the cutoff frequency becomes high.

When playing back an optical disk recorded in the MCAV format, the frequency of the reproduced signal, i.e. the frequency band, becomes higher in tracks closer to the outer circumference of the optical disk 19.

Thus, the CPU 7b (see FIG. 4) outputs, to the D/A converter 6b, larger values (digital voltage value) when the head is closer to the outer circumference. The D/A converter 6b converts the digital voltage value, and outputs a bias voltage to the band limiting circuit 14. As a result, the closer the head is to the outer circumference of the optical disk 19, the higher the cutoff frequency becomes.

In FIG. 5, the reproduced signal input from the input terminal is output from the output terminal, with those frequency components which are higher than the cutoff frequency attenuated, by means of the impressed bias voltage due to the D/A converter 6b. The output reproduced signal is input to the 2-valued circuit 5. The cutoff frequency may be greater than the frequency band of the reproduced signals for each respective head position. The output value from the CPU 7b may be a value read from a memory by the CPU 7b according to the head position information, and output to the D/A converter 6b.

It is preferable that the characteristics of the variable capacity diode D11 be similar to the characteristics of the variable capacity diode D12. Further, the characteristics of the variable capacity diode D13 should be similar to the characteristics of the variable capacity diode D14. Likewise the variable capacity diode D15 and the variable capacity diode D17 should have characteristics similar to the variable capacity diode D16 and the variable capacity diode D18, respectively. It is furthermore preferable for the characteristics of all the variable capacity diodes D11–D18 to be the same.

Although the second embodiment of the present invention has been described with respect to a specific configuration, it will be recognized that the second embodiment is not limited to the specific configuration. For example, the second embodiment has been described with respect to a specific configuration of the optical disk 19 as a type of disk used solely for playback. However, it may also be an magneto-optical disk, a rewritable optical disk, or the like.

Figure 6:
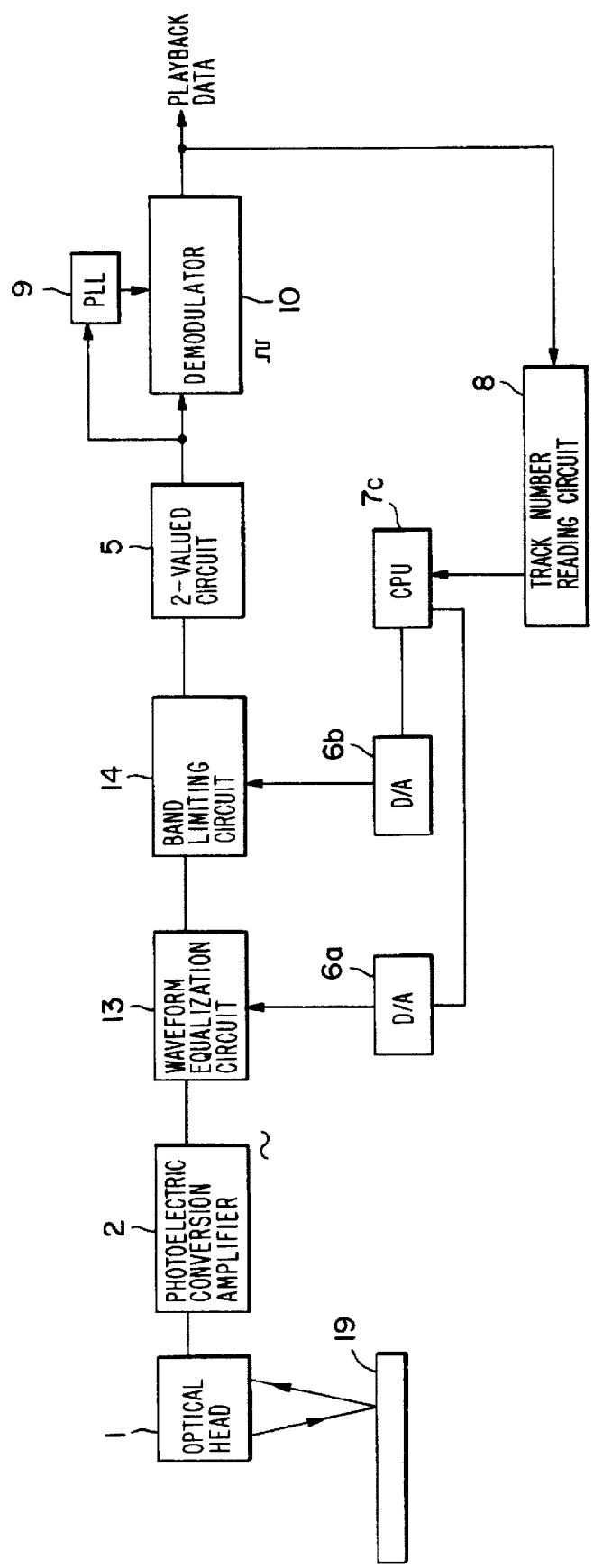
FIG. 6 is a diagram of an optical disk playback device according to a third preferred embodiment of the present invention.

Further, while the preferred embodiment of the present invention has been described with respect to the use of a MCAV format, a zone CAV format may be used. The zone CAV format separates plural tracks of the disk into plural groups. These groups are called zones. The zones are present in donut form. Recording and playback are performed at the same constant clock frequency for tracks belonging to the same zone. In this manner, the record density of each zone is approximately constant. The digital value output from the CPU is changed according to the group to which the track at the head position belongs. FIG. 6 is a diagram of an optical disk playback device in accordance with the third preferred embodiment of the present invention.

The optical disk playback device in accordance with the third preferred embodiment generally comprises an optical head 1, an optical disk 19, a photoelectric conversion amplifier 2, a waveform equalizing circuit 13, a 2-valued circuit 5, a PLL circuit 9, a demodulator circuit 10, a track number reading circuit 8, and a D/A converter 6a each of which are similar to the respective counterparts set forth with respect to the first preferred embodiment of the present invention. The band limiting circuit 14 and the D/A converter 6b are similar to the respective components set forth with respect to the second preferred embodiment of the present invention.

The CPU 7c, operates to output a digital value to the D/A converter 6a to set the amount of delay of the constant time delay filters 21 a–d. The CPU 7c also operates to output a digital value to the D/A, converter 6b to set the cutoff frequency of the band limiting circuit 14.

Although the third embodiment of the present invention has been described with respect to a specific configuration, it will be recognized that the third embodiment is not limited to the specific configuration. For example, the third embodiment has been described with respect to a specific configuration of the optical disk 19 as a type of disk used solely for playback. However, it may also be an magneto-optical disk, a rewritable optical disk, or the like.

Further, while the preferred embodiment of the present invention has been described with respect to the use of a MCAV format, a zone CAV format may be used. The zone CAV format separates plural tracks of the disk into plural groups. These groups are called zones. The zones are present in donut form. Recording and playback are performed at the same constant clock frequency for tracks belonging to the same zone. In this manner, the record density of each zone is approximately constant. The digital value output from the CPU is changed according to the group to which the track at the head position belongs.

Although a few preferred embodiments of the present invention have been shown and described, it would be appreciated by those skilled in the art that changes may be made in these embodiments without departing from the principles and spirit of the invention, scope of which is defined in the claims and their equivalents.

What is claimed is:

1. An optical disk replay device comprising:
    an optical head to output a reproduced signal based on information stored on an optical disk;
    a plurality of delay circuits connected to said optical head to output a plurality of delayed signals based on the reproduced signal;
    a calculating circuit, connected to said plurality of delay circuits, to sum the plurality of delayed signals and output an equalized reproduced signal; and
    a control circuit to change the amount of delay in said plurality of delayed signals based on the position of said optical head.

2. An optical disk replay device as set forth in claim 1, wherein said control circuit decreases the amount of delay in said plurality of delayed signals as said optical head moves closer to a periphery of the optical disk.

3. An optical disk replay device as set forth in claim 1, wherein said calculating circuit subtracts the plurality of delayed signals.

4. An optical disk replay device as set forth in claim 1, wherein the optical disk is formatted in the MCAV format having a plurality of tracks and wherein said control circuit changes the amount of delay in said plurality of delayed signals based on which track is being accessed on the optical disk.

5. An optical disk replay device as set forth in claim 1, wherein said plurality of delay circuits comprises a plurality of variable capacity diodes.

6. An optical disk replay device as set forth in claim 5, wherein said control circuit varies the voltage across the variable capacity diodes so as to change the amount of delay in said plurality of delayed signals.

7. An optical disk replay device as set forth in claim 6, wherein said control circuit increases the voltage across the variable capacity diodes as said optical head moves closer to a periphery of the optical disk.

* * * * *